UNITED STATES PATENT OFFICE.

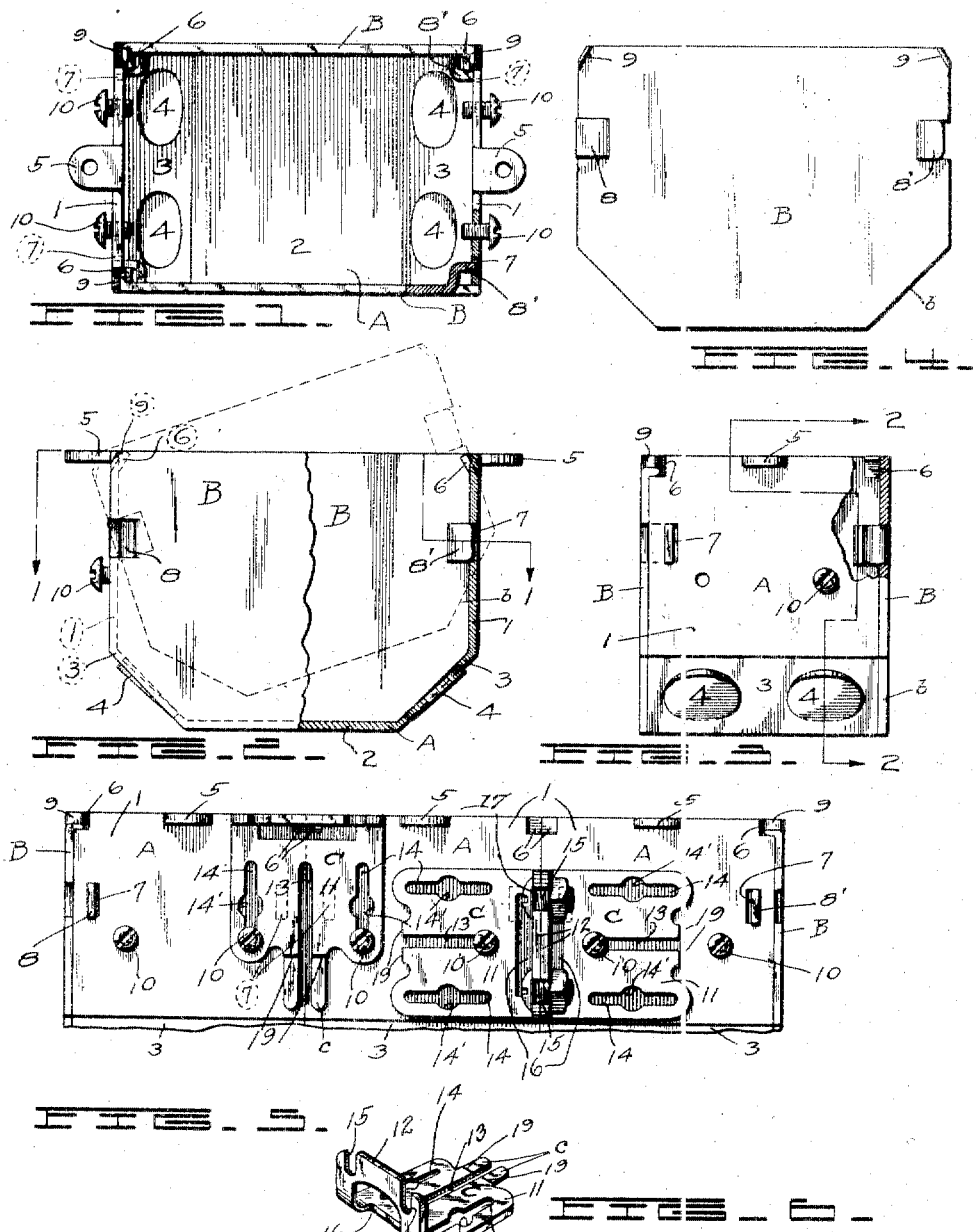

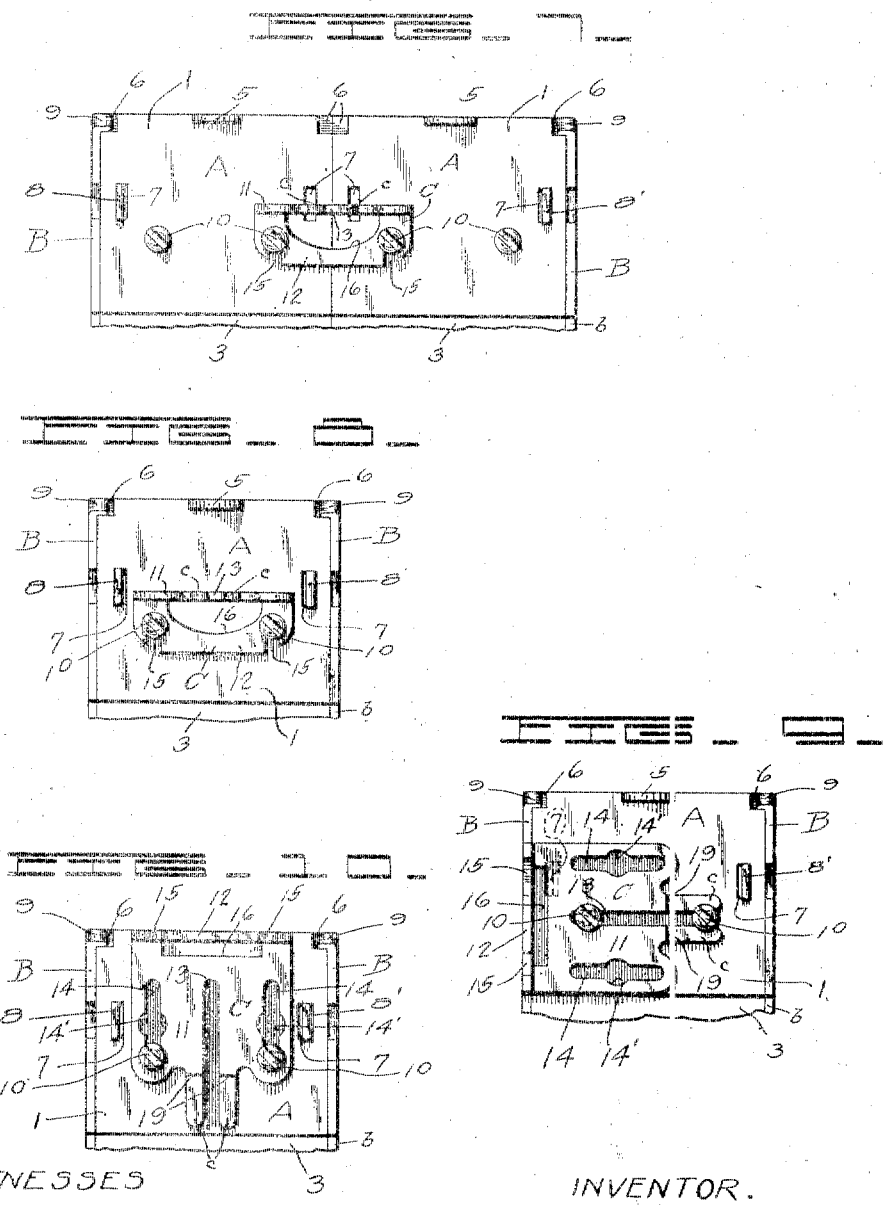

WILLIAM WURDACK, OF ST. LOUIS, MISSOURI.

JUNCTION OR OUTLET BOX.

1,221,944.
Specification of Letters Patent.
Patented Apr. 10, 1917.

Application filed February 3, 1915. Serial No. 5,903.

*To all whom it may concern:*

Be it known that I, WILLIAM WURDACK, a citizen of the United States, residing at the city of St. Louis, State of Missouri, have invented certain new and useful Improvements in Junction or Outlet Boxes, of which the following is a specification, reference being had to the accompanying drawings, forming a part thereof.

This invention relates generally to junction or outlet boxes and, more particularly, to certain new and useful improvements in outlet boxes especially designed and intended to receive and securely support switches, fuse-blocks, and the like in electric wiring installations.

The objects of my present invention are to provide a box of the kind stated in sections, the sections of which may be readily and conveniently detachably operatively assembled without the use or employment of screws or other analogous fastening means; to provide a box of the kind stated comprising what are commonly known in the trade as gangible sections (that is to say, such sections as are adapted to be operatively edgewise associated together in a group or gang) and means for fastening the same operatively together, whereby the box may be enlarged to suit the particular installation being made; to provide a box of the kind stated with attaching and fastening members which may be secured to the box in various operative positions and which afford a wide range of adjustments of the box relatively to its supporting wood-work or the like to meet the conditions and requirements of different installations; and to generally improve upon, and simplify the construction of, boxes of the class described.

With the above and other objects in view, my present invention resides in certain novel features of form, arrangement, construction, and combination of parts, all as will herein-after be described and afterward pointed out in the claims.

In the accompanying drawings, which show my invention in preferred form,

Figure 1 is a front elevational view, partly in section on approximately line 1—1, Fig. 2, of an outlet or switch-box embodying my invention;

Fig. 2 is an end elevational view, partly in section on approximately line 2—2, Fig. 3, of the same;

Fig. 3 is a side elevational view of the same partly broken away;

Fig. 4 is an inside elevational view of one of the detachable end-walls of the box;

Fig. 5 is a side elevational view illustrating a plurality of box-sections, partly broken away, operatively ganged or edgewise associated or grouped together, the adjustable members or brackets for so securing or fastening the several box-sections together and to the studding or wood-work of the building or other structure being shown in some of their different interchangeable positions;

Fig. 6 is a perspective view of one of the adjustable brackets or members usable with my new box for operatively attaching the same to the studding or wood-work of a building or other structure and for operatively securing several box-sections together in so-called ganged relation;

Fig. 7 is also a side elevational view illustrating a pair of box-sections operatively ganged or edgewise associated together, the adjustable bracket for so securing or fastening the box-sections together and to the wood-work of the building being shown in another of its different or interchangeable positions relatively thereto; and Figs. 8, 9, and 10 are side elevational views of a single box or unit embodying my invention with the attaching or fastening bracket therefor shown in different interchangeable operative positions relatively thereto.

Referring to the said drawings, in which like reference characters refer to like parts throughout the several views, my new box as a unit may be of suitable size and shape and comprises a main or body-section A and a pair of end-walls B—B. Both end-walls B are preferably detachable from main section A, so that a particular section A may have other similar sections ganged or attached thereto at both its opposite sides, one pair of end-walls B being only required for the box whether used as a unit with a single main or body-section A or enlarged by several main-sections A ganged or associated edgewise together, as seen, respectively, in Figs. 1, 5, and 7.

Main section A, which is approximately U-shape in side elevation, is preferably stamped up or otherwise formed from a single sheet metal blank to integrally include and provide a pair of approximately parallel side-walls 1—1, a rear wall 2, and diagonal wall-portions 3—3 therebetween, the walls of section A being of suitable stiffness and wall-portions 3 being provided with suitable knock-outs 4 for the passage of electric wires and the like into and from the box, as will be well understood. At its front edge, each side-wall 1 is provided preferably centrally with an outwardly-projecting perforated ear 5, to which ears 5 the switch or the like arranged and contained within the box is adapted to be suitably secured. At its outer corners, each side-wall 1 of box-section A is also slightly bent or displaced inwardly to provide obliquely disposed lips 6, for purposes hereinafter appearing. Each side-wall 1 of section A is further provided with a pair of short slots 7—7, said slots lying adjacent to, and extending parallel with, the opposite side edges of the wall, as clearly seen in Figs. 8, 9, and 10.

Each wall B, which is also preferably stamped up from a sheet of suitable substantially stiff or rigid metallic material into the form seen in Fig. 4 to fit upon section A at its end, wall B being of such shape and size relatively to section A as to neatly overlie the side edges of said rear wall 2 and both said side walls 1. At its opposite sides, wall B is preferably integrally provided with outwardly presented oppositely disposed approximately rigid tongues 8—8' offset inwardly from the wall. These tongues 8—8', while suitably offset inwardly from the same face of wall B, extend approximately longitudinally with wall B and are adapted to endwise fit in slots 7—7, one of said tongues, as, for instance, tongue 8', being preferably rounded at its corners, as seen in Fig. 4, and slightly reduced in length relatively to opposite tongue 8. At its opposite outer corners, each wall B is also provided with small inwardly-projecting lugs 9—9 adapted to fit upon and engage with said lips 6—6 when wall B is in operative position upon section A.

In assembling a wall B with main section A, wall B is placed or positioned flatwise upon the end side of section A with its tongue 8 projecting partially into its coöperating slot 7, as illustrated by dotted lines in Fig. 2. Wall B then, under the force of a sharp blow or two or other pressure applied to and upon its outer edge, is moved edgewise obliquely rearwardly until its tongue 8' snaps into operative engagement with its coöperating slot 7, opposite tongue 8 at the same time engaging fully with its slot 7, whereupon section A and wall B are firmly and tightly detachably assembled and locked together without the employment or use of screws or similar fastening members. In such edgewise rearward movement of wall B relatively to and upon section A, the metal of section A at its side walls A is, under the forced engagement therewith of tongue 8' of wall B, somewhat sprung outwardly to permit the entrance into, and locking engagement with, slots 7 of the tongues 8—8'. Wall B fitting upon section A as described, with its tongues 8—8' in locking engagement with said slots 7, the lugs 9 removably fit upon and engage with said lips 6 and thereby prevent spreading of section A at the front edges of its side walls A. To disengage wall B from section A, a sharp blow or two or other suitable pressure applied to and upon the diagonal edge $b$ of wall B serves to at once force tongue 8' from locking engagement with its slot 7, the metal of section A being again somewhat sprung outwardly under the forced engagement therewith of tongue 8', when tongue 8 may be also removed from locking engagement with its slot 7 and the wall B then fully detached from section A.

Threaded into each side wall 1 of section A at suitable points thereupon, is an alining pair of properly spaced apart studs, headed screws, or the like 10, whereby a fastening member or bracket C, seen in perspective in Fig. 6, is adapted to be adjustably secured to each of the side-walls 1 of the box in various operative positions to meet the particular conditions or requirements of different installations. This bracket C comprises a main plate or body-portion 11 and a flange 12 projecting approximately at right angles from portion 11. Centrally main or plate portion 11 of bracket C is provided longitudinally with an elongated open-end slot or aperture 13. Portion 11 of bracket C is also provided with a pair of slots or apertures 14—14 disposed on opposite sides of, and extending parallel with, center slot 13, each slot 14 being preferably widened midway its length, as at 14', to permit the entrance therethrough of the head of one of said screws 10. It will be noted that screws 10 are threaded into wall 1 of section A at such distance apart to correspond with the distance between the slots 14—14 of bracket C, the flange 12 of bracket C being also provided longitudinally relatively to the bracket with a pair of screw preferably open-end slots or apertures 15—15 spaced apart likewise a distance equal to the distance between slots 14—14. Each of the slots of bracket C has a width sufficient only to accommodate the shank of a screw 10, whereby, on tightening said screw, bracket C, being in one of its several positions relatively to the box and said screws 10 engaging with either slots 15, slots 14, or center slot 13, may be securely held in adjusted position upon the box.

In installing boxes of this class, it is desirable that the box, at its open front side, should be approximately flush with the surface of the wall, in order that the face or cover-plate used therewith neatly fit flatwise thereupon and the adjacent parts of the surface of the wall, the cover-plate usually projecting at its edges upon the wall beyond the edges of the box. It is also desirable that the box be fastened directly to the woodwork of the wall, in order that the box be firmly and rigidly secured and held in proper position in the installation. The arrangement and condition of the wood-work of the wall also varying with different installations, I am enabled by and with the brackets C and their securing screws 10 to meet all such conditions and requirements within a very wide range. Should the conditions of a particular installation require, the bracket C may be arranged with its flange 12 flatwise upon the wall 1 of the box with screws 10 engaging its slots 15, as illustrated in Fig. 8, the screws, nails, or other fastening members for securing the box to the wood-work then engaging the bracket, the bracket being in the position stated, at the slot 13 or slots 14 in the main or body-portion 11 thereof. Or, to meet the conditions of a particular installation, the bracket C may be arranged with its main portion 11 flatwise upon the side-wall 1 of the box with the screws 10 engaging its center slot 13 and its flange 12 being presented toward the end-wall B of the box, as illustrated in Fig. 9, the bracket C being adjusted relatively to the box and the wall as may be required; when in such position, the screws, nails, or the like for fastening the box to the wood-work may engage the bracket at the slots 15 of its flange 12. Or, again, to meet the conditions of a different installation, the bracket C may be arranged with its main portion 11 flatwise upon the side-wall 1 of the box with the screws 10 engaging its slots 14 and its flange 12 being presented toward the front of the box, as illustrated in Fig. 10, the bracket C being adjusted relatively to the box and the wall as may be required and the screws, nails, or the like for fastening the box to the wood-work also engaging the bracket at the slots 15 of its flange 12. To accommodate the ear 5 of the box when bracket C is arranged in its relative position last mentioned, the material of the bracket is cut away, as at 16, at and adjacent to the bend therein joining body-portion 11 and flange 12.

Furthermore, should it be required to enlarge the box to suit the conditions of a particular installation, an end-wall B, or both end-walls B, as may be necessary, is or are detached from a main section A as before described and additional sections A ganged or edgewise associated therewith, as seen in Fig. 5, the end-wall or walls B being again attached to the outermost sections A. In so ganging or associating main sections A together, brackets C also may be so arranged in various operative positions relatively to the main sections A as to not only most conveniently fasten the several sections A operatively together, but at the same time best answer the requirements and conditions of the installation being made, as illustrated in Figs. 5 and 7. As there shown, the brackets C may be arranged either with their main portions 11 flatwise upon the side walls 1 of two adjacent sections A with their flanges 12 presented forwardly, the bracket being adjusted relatively to the box as may be required and a screw 10 of each section A engaging the opposite slots 14 of a particular bracket C; or the brackets C may be arranged with their flanges 12 flatwise upon the side-walls 1 of two adjacent sections A with their main or body-portions 11 presented outwardly, a screw 10 of each section A engaging the slots 15 of a particular bracket; or, again, a pair of brackets C may be arranged with their main portions 11 flatwise upon the side-walls 1 of two adjacent sections A with the flanges 12 thereof presented toward the end sides of the respective sections A and facing each other, a screw 10 of each section A engaging the center slots 13 of the brackets and small stove-bolts or the like 17 engaging the slots 15 of the flanges 12 of the brackets being employed to fasten the said brackets together. Preferably wall-portions c of center slot 13 of bracket C are scored or otherwise weakened, as at 19, adjacent their outer ends, so that, should the brackets C be arranged and employed as last described, the same may be readily clipped off to prevent interference with adjacent sets of brackets C.

Thus it will be seen that my new box is readily usable both as a single unit, that is to say, when comprising but a single section A, or when built up into a gang, that is to say, when comprising a plurality of sections A, and that the box is exceedingly flexible to meet practically all working conditions and requirements.

I am aware that changes in the form, construction, arrangement, and combination of the several parts of my new box may be made and substituted for those herein shown and described without departing from the nature and spirit of my invention.

Having thus described my invention, what I claim and desire to secure by Letters Patent is:

1. In a box of the class described, a suitably stiff metallic main section comprising a rear wall and a pair of approximately parallel side walls, each of said side walls being provided with an aperture, a separate substantially rigid metallic section adapted to removably fit at approximately right angles upon and overlie, the side edges of said rear wall and both said side walls and provide an end wall for said main section, and a pair of oppositely disposed approximately rigid tongues offset from one face of said end-wall-section adapted to endwise removably project into the apertures of, and thereby engage with, said side walls to detachably lock said sections operatively together, said tongues each extending approximately longitudinally of said end-wall-section and said end-wall-section being movable edgewise into and out of operative position relatively to said main section.

2. In a box of the class described, an approximately U-shaped suitably stiff metallic main section integrally including and providing a rear wall and a pair of approximately parallel side walls, each of said side walls being provided with a slot adjacent its side edge, a separate substantially rigid metallic section adapted to removably fit at approximately right angles upon, and overlie, the side edges of said rear wall and both said side walls and provide an end wall for said main section, and a pair of oppositely disposed approximately rigid tongues on said end-wall-section adapted to endwise removably project into said slots and thereby engage with said side walls to detachably lock said sections operatively together, said tongues being integrally offset inwardly from one face, and each extending approximately longitudinally of said end-wall-section and said end-wall section being movable edgewise into and out of operative position relatively to said main section.

3. In a box of the class described, a metallic main section comprising a rear wall and a pair of approximately parallel side walls, each of said side walls being provided with an aperture and an inwardly-presented lip, a separate substantially rigid metallic section adapted to removably fit upon, and overlie, the side edges of said rear wall and both said side walls and provide an end wall for said main section, approximately rigid offset tongues on said end-wall-section adapted to endwise removably project into said apertures and thereby engage with said side walls to detachably lock said sections operatively together, said end-wall-section being movable edgewise into and out of operative position relatively to said main section, and inwardly-presented lugs on said end-wall-section adapted to removably fit upon and engage with said lips when said end-wall-section is in operative position upon said main section.

4. In a box of the class described, the combination with a metallic main section, said main section including a rear wall and a pair of side walls, of a separate metallic end-section, said sections being so constructed as to detachably engage one with the other and interlock by snap action, said end-section being movable edgewise into and out of operative engagement with the main section and when in operative engagement with the main section overlying the side edges of said rear wall and both said side walls.

5. In a box of the class described, a suitably stiff metallic main section including and providing a rear wall and a pair of side walls, each of said side walls being provided with an aperture, a separate substantially rigid metallic section adapted to removably fit upon, and overlie, the side edges of said rear wall and both said side walls and provide an end wall for said main section, and a pair of oppositely disposed approximately rigid inwardly offset tongues on said end-wall section adapted to removably endwise project into said apertures and thereby engage with said side walls to detachably lock said sections operatively together, said end-wall-section being movable approximately obliquely edgewise relatively to said main section and the metal of said main section being sprung in the operative engagement with and disengagement from said side walls of said tongues.

6. In an outlet-box of the class described, a metallic main section including a rear wall and side walls, each of said side walls being provided with a slot and with a pair of oppositely-disposed inwardly-presented lips, and a detachable end wall for said main section provided with a pair of tongues adapted to removably fit said slots and with a pair of oppositely-disposed inwardly-presented lugs adapted to engage upon said lips, the metal of said main section, in the assemblage of said end wall with said main section, being sprung to permit operative engagement of said tongues with said slots.

7. In a box of the class described, a main section, said section including a side wall, an adjustable securing-bracket for the box including a body-portion and a flange-portion projecting approximately at right angle to said body-portion, said bracket being longitudinally provided at its said flange-portion with a pair of spaced apart slots and also longitudinally at its said body-portion with a pair of equally spaced apart slots and with a third slot extending lengthwise between and parallel with said last-named pair of slots, and a pair of spaced apart members on said side wall, said bracket being adapted to operatively fit at either of its said portions flatwise upon said side wall, one or the other of said members being adapted to fit into said third slot or both said members being adapted to severally fit in the slots of either of said pairs of slots and thereby engage with said bracket to adjustably fasten said bracket in one or the other of its said operative positions upon said side wall.

8. In a box of the class described, a pair of gangible sections, a pair of ganging-brackets for said sections each including a slotted body-portion and a flange-portion projecting approximately at right angle to said body-portion, said brackets fitting flatwise at their said body-portions upon said sections, members on said sections fitting the slots of said body-portions and engaging with said brackets for fastening said brackets to said sections, and bolts transversely engaging the flange-portions only of both said brackets for fastening said brackets and thereby said sections together.

9. In a box of the class described, an attaching and fastening bracket integrally including a body-portion and a flange-portion projecting approximately at right angle to said body-portion, said bracket being longitudinally provided at its said flange-portion with a pair of spaced apart slots and also longitudinally at its said body-portion with a pair of equally spaced apart slots and with a third slot extending lengthwise between and parallel with said last-named pair of slots, substantially as and for the purpose described.

10. The combination with an outlet box, of an attaching-bracket for the box including a plate and a flange projecting at right angles from one end thereof, said plate being provided longitudinally with a pair of spaced apart slots and with a third slot extending lengthwise between and parallel with said first slots, and a pair of similarly spaced apart members projecting from one wall of the box, said members being adapted selectively to fit into either said third slot or into said pair of slots and thereby engage with the bracket to fasten the bracket upon the box with said flange disposed either toward the front or rear of the box or toward a side thereof.

11. The combination with an outlet box, of an attaching-bracket for the box including a plate and a flange projecting at right angles from one end thereof, said flange being provided with a pair of spaced apart apertures and said plate being provided with a pair of equally spaced apart apertures and with a third aperture therebetween, and a pair of similarly spaced apart members projecting from one wall of the box, the bracket being adapted reversibly to operatively fit at either of its said portions flatwise upon said wall of the box, one or the other of said members being adapted to fit into said third aperture or both said members being adapted to severally fit in the apertures of either of said pairs of apertures to selectively fasten the bracket in one or the other of its said operative positions upon said wall of the box.

In testimony whereof, I have signed my name to this specification, in the presence of two subscribing witnesses.

WILLIAM WURDACK.

Witnesses:
  RUTH PETERSON,
  J. W. NAYLOR.